(12) United States Patent
Liu et al.

(10) Patent No.: US 11,823,429 B2
(45) Date of Patent: Nov. 21, 2023

(54) METHOD, SYSTEM AND DEVICE FOR DIFFERENCE AUTOMATIC CALIBRATION IN CROSS MODAL TARGET DETECTION

(71) Applicant: INSTITUTE OF AUTOMATION, CHINESE ACADEMY OF SCIENCES, Beijing (CN)

(72) Inventors: Zhiyong Liu, Beijing (CN); Lu Zhang, Beijing (CN); Xu Yang, Beijing (CN)

(73) Assignee: INSTITUTE OF AUTOMATION, CHINESE ACADEMY OF SCIENCES, Beijing (CN)

( * ) Notice: Subject to any disclaimer, the term of this patent is extended or adjusted under 35 U.S.C. 154(b) by 507 days.

(21) Appl. No.: 17/263,900

(22) PCT Filed: May 25, 2020

(86) PCT No.: PCT/CN2020/092039
§ 371 (c)(1),
(2) Date: Jan. 28, 2021

(87) PCT Pub. No.: WO2021/000664
PCT Pub. Date: Jan. 7, 2021

(65) Prior Publication Data
US 2021/0326624 A1 Oct. 21, 2021

(30) Foreign Application Priority Data
Jul. 3, 2019 (CN) .......................... 201910595902.7

(51) Int. Cl.
G06T 7/00 (2017.01)
G06V 10/25 (2022.01)
(Continued)

(52) U.S. Cl.
CPC ............ G06V 10/25 (2022.01); G06F 18/214 (2023.01); G06F 18/2414 (2023.01);
(Continued)

(58) Field of Classification Search
CPC ......... G06T 2207/10048; G06T 7/0004; G06T 2207/10028; G06T 7/20;
(Continued)

(56) References Cited

U.S. PATENT DOCUMENTS

| 2017/0243336 | A1* | 8/2017 | Zou | ........................... G06T 5/50 |
| 2018/0005021 | A1* | 1/2018 | Young | ................... G06V 40/165 |
| 2019/0080431 | A1* | 3/2019 | Choi | ..................... G06V 40/172 |

FOREIGN PATENT DOCUMENTS

| CN | 108960073 A | 12/2018 |
| CN | 109299342 A | 2/2019 |
| CN | 110334708 A | 10/2019 |

OTHER PUBLICATIONS

Lu Zhang, et al., The Cross-Modality Disparity Problem in Multispectral Pedestrian Detection, 2019.

* cited by examiner

Primary Examiner — Quan M Hua
(74) Attorney, Agent, or Firm — Bayramoglu Law Offices LLC

(57) ABSTRACT

A method, a system and a device for difference automatic calibration in cross modal target detection are provided. The method includes: obtaining a plurality of modals of color-thermal images to be detected, and constructing an input image set; acquiring a feature map of each modal image in the input image set, and extracting a shared candidate region; aligning the shared candidate region, and obtaining a feature representation of the each shared candidate region through pooling; obtaining a category of the feature representation of the shared candidate region based on a preset classifier, and obtaining a position of the shared candidate region through deviation regression; adopting non-maximum value suppression to obtain a shared candidate region with the highest probability according to the category of the (Continued)

feature representation of the shared candidate region, and returning to the image to be detected for marking according to the position of the shared candidate region.

20 Claims, 2 Drawing Sheets

(51) Int. Cl.
- *G06F 18/214* (2023.01)
- *G06F 18/25* (2023.01)
- *G06F 18/2413* (2023.01)
- *G06V 10/764* (2022.01)
- *G06V 10/82* (2022.01)
- *G06V 20/58* (2022.01)
- *G06V 40/10* (2022.01)

(52) U.S. Cl.
CPC .......... *G06F 18/251* (2023.01); *G06V 10/764* (2022.01); *G06V 10/82* (2022.01); *G06V 20/58* (2022.01); *G06V 40/10* (2022.01); *G06V 2201/07* (2022.01)

(58) Field of Classification Search
CPC ... G06T 2207/10024; G06T 3/60; G06T 7/70; G06T 2207/10016; G06T 2207/30164; G06T 7/0012; G06T 7/50; G06T 5/00; G06T 7/246; G06T 7/80; G06T 7/33; G06T 1/005; G06T 11/00; G06T 7/30; G06T 2200/24; G06T 2207/30208; G06T 3/40; G06T 5/003; G06T 7/11; G06T 7/60; G06T 7/74; G06T 2207/10032; G06T 2207/30168; G06T 2207/30188; G06T 2207/20061; G06T 2207/20212; G06T 2210/22; G06T 15/205; G06T 17/00; G06T 19/20; G06T 2207/10021; G06T 2207/10036; G06T 2207/10044; G06T 2207/20041; G06T 2207/20044; G06T 2207/20101; G06T 2207/20152; G06T 2207/20182; G06T 2207/20224; G06T 2207/30261; G06T 2210/12; G06T 3/0006; G06T 7/0014; G06T 7/136; G06T 7/174; G06T 7/73; G06T 2207/20132; G06T 2210/56; G06T 3/4038; G06T 7/337; G06T 2207/20221; G06V 10/143; G06V 20/52; G06V 20/80; G06V 10/803; G06V 20/20; G06K 19/06178
See application file for complete search history.

METHOD, SYSTEM AND DEVICE FOR DIFFERENCE AUTOMATIC CALIBRATION IN CROSS MODAL TARGET DETECTION

CROSS REFERENCE TO THE RELATED APPLICATIONS

This application is the national phase entry of International Application No. PCT/CN2020/092039, filed on May 25, 2020, which is based upon and claims priority to Chinese Patent Application No. 201910595902.7, filed on Jul. 3, 2019, the entire contents of which are incorporated herein by reference.

TECHNICAL FIELD

The present invention relates to the technical fields of computer vision, pattern recognition and machine learning, and in particular to a method, a system and a device for difference automatic calibration in cross modal target detection.

BACKGROUND

Pedestrian detection is an important research topic in the field of computer vision, with multiple applications such as video surveillance, autonomous driving, and robotics. In recent years, many works in the areas of robot vision, pedestrian detection and 3D target detection have shown that the introduction of new input modals can improve the performance of the detector and provide more competitive advantages over single sensor systems. In addition, as new types of sensors (such as infrared and depth cameras) become cheaper and more readily available, multi-modal input sources can be used in more application scenarios, including autonomous driving, security surveillance, military operations, and the like. As a result, multi-spectral pedestrian detection has attracted widespread attention, which provides new opportunities to solve challenging problems such as adverse lighting conditions and occlusion.

In a current multi-spectral pedestrian data set, color-thermal images are subjected to maximum geometrical alignment, and the data set provides modeling sharing annotations. Most advanced multi-spectral pedestrian detectors generally build their frameworks on that basis. However, in actual scenes, this model alignment assumption is difficult to hold due to various factors, such as differences in sensor physical characteristics (such as parallax, resolution mismatch, and imperfect field of view), imperfect alignment algorithms, external interference, and hardware aging. In addition, even if in the automatically aligned multi-spectral data set, non-rigid transformations can still be observed in many color-thermal image pairs. Due to the problem of position change, it is more difficult to locate pedestrians. The present invention defines it as a cross modal difference problem, that is, the spatial difference of images between two or more modes, which is specifically embodied as the color-thermal difference in multi-spectral pedestrian detection.

Generally, the color-thermal difference problem mainly reduces the performance of the pedestrian detector in two aspects. First, the features to be fused are inconsistent, because different spectral input images do not match at corresponding positions, which may lead to unstable inferences, including classification and positioning. In addition, for a real pedestrian example, it is difficult for the detector to determine the reliable position without clearly indicating which modal image is used as the reference image. Secondly, due to the problem of color-thermal difference, modal shared labels will introduce serious label deviation. Specifically, since labels are assigned to color and thermal images at the same time, the bounding box of the label needs to be widened to simultaneously frame two modal targets. This naturally introduces a deviation for each mode separately, and leads to a deviation in the return target during the positioning process. In addition, for detectors based on deep convolutional neural network (CNN), the bias label will affect the mini-batch sampling process, because in this process, the intersection over union (IOU) is used for the calculation of foreground/background classification.

In addition, the calibration and alignment process of a color thermal imager is very complicated, and usually requires specific hardware and a special calibration board. Once the equipment is running, some unavoidable external forces, such as mechanical vibration and temperature change, are likely to reduce the calibration quality. Therefore, one of the most critical problems confronted by current multi-spectral pedestrian detectors is how to locate pedestrians stably in the case of mismatched modals.

SUMMARY

In order to solve the above-mentioned problems in the prior art, that is, to solve the problem of inaccurate detection caused by the color-thermal image difference, in the first aspect, the present invention provides a method for difference automatic calibration in cross modal target detection, including:

step S10, obtaining a plurality of modals of color-thermal images to be detected, and constructing an input image set;

Step S20, acquiring a feature map of each modal image in the input image set, and extracting a shared candidate region based on the feature map of the each modal image;

step S30, aligning the each shared candidate region obtained, and obtaining a feature representation of the each shared candidate region through pooling;

step S40, obtaining a category of the feature representation of the shared candidate region based on a preset two-layer fully connected classifier, and obtaining a position of the shared candidate region through deviation regression;

step S50, according to the category of the feature representation of the shared candidate region, adopting non-maximum value suppression to obtain a shared candidate region with the highest probability, and returning to the image to be detected for marking according to the position of the shared candidate region.

In some preferred embodiments, a method for extracting the shared candidate region based on the feature map of the each modal image includes: first performing a 1×1 convolution operation on the feature map of the each modal image for point-to-point fusion, and using a region proposal network (RPN) to extract the shared candidate region.

In some preferred embodiments, the each shared candidate region obtained is aligned, and the method thereof is:

using the RoIAlign method to gather a region feature of the shared candidate region, and using subtraction to calculate the region feature residual;

based on the region feature residual, obtaining an offset target, and transforming and aligning the offset target through Smooth L1 loss.

In some preferred embodiments, the offset target includes an offset target $t_x, t_y$ corresponding to a center coordinate x, y of the shared candidate region, and the method for obtaining the offset target is:

$$t_x = (x_s - x_r)/w_r$$

$$t_y = (y_s - y_r)/h_r$$

where, $x_s$, $x_r$ respectively represent the calibrated X axis coordinate values of the sensing modal and the reference modal, $y_s, y_r$ respectively represent the calibrated y axis coordinate values of the sensing modal and the reference modal, $w_r$ represents the width of the bounding box of the reference modal, and $h_r$ represents the height of the bounding box of the reference modal.

In some preferred embodiments, the offset target randomly jitters during a training process to obtain a new offset transformation relationship between the modals, and the calculation method is as follows:

$$t_x^j, t_y^j \sim N(0, \sigma_0^2; 0, \sigma_1^2; 0)$$

where, $t_x^j, t_y^j$ represents the coordinate of the offset target, the N(.) function represents the two-dimensional normal distribution, σ represents the standard deviation of the normal distribution, $\sigma_0^2$ represents the variance value on the x-axis, and $\sigma_0^2$ represents the variance value on the y-axis.

In some preferred embodiments, in the training process of the RPN, except for the layers involved in a pre-training initialization, other new layers use a Gaussian distribution with a mean value of 0 and a standard deviation of 0.01 for initialization.

In some preferred embodiments, in the "non-maximum value suppression" of step S50, a threshold is set to 0.5, all output boxes in the category are arranged in descending order, and redundant boxes that have a higher degree of overlapping with the highest-scoring box than the threshold are gradually deleted.

In the second aspect, the invention provides a system for difference automatic calibration in cross modal target detection, and the system includes an acquisition module, an extraction module, an alignment module, a classification module, and an output module.

The acquisition module is configured to obtain a plurality of modals of color-thermal images to be detected, and construct an input image set.

The extraction module is configured to acquire a feature map of each modal image in the input image set, and extract a shared candidate region based on the feature map of the each modal image.

The alignment module is configured to align the each shared candidate region obtained, and obtain a feature representation of the each shared candidate region through pooling.

The classification module is configured to obtain a category of the feature representation of the shared candidate region based on a preset two-layer fully connected classifier, and obtain a position of the shared candidate region through deviation regression.

The output module is configured to adopt non-maximum value suppression to obtain a shared candidate region with the highest probability according to the category of the feature representation of the shared candidate region, and return to the image to be detected for marking according to the position of the shared candidate region.

In the third aspect, the present invention provides a storage device with a plurality of programs stored thereon, and the programs are loaded by a processor and configured to execute the above-mentioned method for difference automatic calibration in cross modal target detection.

In the fourth aspect, the present invention provides a processing device, including a processor and a storage device. The processor is suitable for executing each program; the storage device is suitable for storing a plurality of programs; and the program is suitable for being loaded by the processor and implementing the above-mentioned method for difference automatic calibration in cross modal target detection.

The advantages of the present invention are as follows.

The invention significantly improves the robustness of the pedestrian detector and the accuracy of cross modal detection. The present invention conducts training in an end-to-end manner, and based on the influence of cross modal differences, provides dense color-thermal annotation pairs, respectively representing the information of each modal. Based on the label pair, a new detection framework is proposed, including the region feature alignment (RFA) module and the RoI (region of interest/candidate region) jitter training strategy, which enables the model to align region features between modals, and prevents the model from learning biased transformation patterns from the original data set, and ultimately makes the detector more stable when faced with cross modal differences.

BRIEF DESCRIPTION OF THE DRAWINGS

By reading the detailed description of the non-restrictive embodiments with reference to the following drawings, other features, purposes and advantages of the present application will become more apparent.

DETAILED DESCRIPTION OF THE EMBODIMENTS

Figure 1:
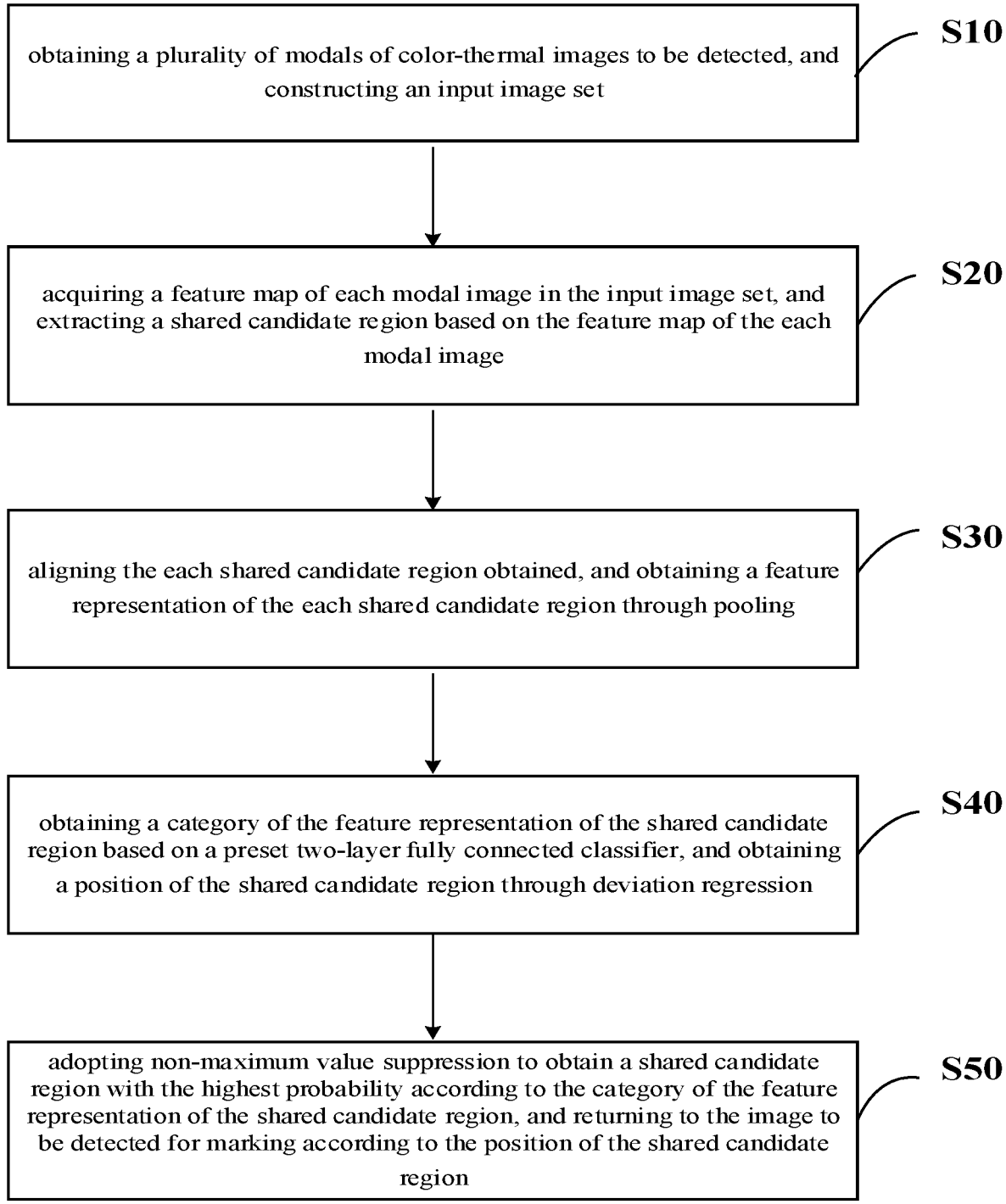
FIG. 1 is a flow chart of an embodiment of the method for difference automatic calibration in cross modal target detection of the present invention.

In order to make the objectives, technical solutions, and advantages of the present invention clearer, the technical solutions in the embodiments of the present invention will be described clearly and completely in conjunction with the accompanying drawings. Obviously, the described embodiments are parts of the embodiments of the present invention, rather than all of the embodiments. Based on the embodiments of the present invention, all other embodiments obtained by those skilled in the art without creative work shall fall within the protection scope of the present invention.

The present application will be further described in detail below with reference to the drawings and embodiments. It can be understood that the specific embodiments described here are only used to explain the related invention, but not to limit the invention. In addition, it should be noted that, for ease of description, only the parts related to the relevant invention are shown in the drawings.

It should be noted that the embodiments in the present application and the features in the embodiments can be combined with each other if there is no conflict.

FIG. 1 shows the method for difference automatic calibration in cross modal target detection of the present invention, including the following steps:

step S10, obtaining a plurality of modals of color-thermal images to be detected, and constructing an input image set;

step S20, acquiring a feature map of each modal image in the input image set, and extracting a shared candidate region based on the feature map of the each modal image;

step S30, aligning the each shared candidate region obtained, and obtaining a feature representation of the each shared candidate region through pooling;

step S40, obtaining a category of the feature representation of the shared candidate region based on a preset two-layer fully connected classifier, and obtaining a position of the shared candidate region through deviation regression;

step S50, according to the category of the feature representation of the shared candidate region, adopting non-maximum value suppression to obtain a shared candidate region with the highest probability, and returning to the image to be detected for marking according to the position of the shared candidate region.

In order to more clearly explain the method for difference automatic calibration in cross modal target detection of the present invention, each step in an embodiment of the method of the present invention will be described in detail below with reference to FIG. 1.

In the following preferred embodiments, the convolutional neural network is first trained, and then the method for difference automatic calibration in cross modal target detection using convolutional neural network to detect pedestrian targets in the plurality of modals of color-thermal images is described in detail.

1. The Training of the Convolutional Neural Network (1) Obtaining the Sample

The present invention aims to study the problem of differences in cross modal target detection, specifically taking pedestrians as an example. The experimental samples are based on the KAIST multi-spectral benchmark data set. In order to study the cross modal differences, the benchmark data set is modally relabeled independently. Due to deviations in the positioning of the target on images of different modals, the present invention provides dense color-thermal label pairs to form clearer multi-modal information of a single pedestrian in the KAIST data set. The experiment is based on the relabeled data set for training.

(2) Preprocessing the Image

In order to prevent the data input to the network from showing a large difference in distribution, and achieve a better effect of image processing, before starting the image processing, all the image data is normalized so that the normalized data has a mean value of 0 and a variance of 1. This operation is required for both training images and testing images before the images are sent to the network. To be consistent, both color and thermal images use the same preprocessing method. Pixel value normalization is used to simplify and regularize the distribution of pixels, enhance data reliability, and improve the effect of subsequent processing.

(3) Feature Extraction

The present invention uses the convolutional neural network to perform the feature extraction on images of different modals. Since different modals have different image appearances, the convolutional neural network parameters corresponding to the two modals are also independent of each other. The basic convolutional neural network model parameters are initialized by using the parameters of the first few layers of the VGG 16 model pre-trained on the ImageNet data set, and are updated in the process of backpropagation. Through convolution, the VGG 16 model can obtain the feature maps of color and thermal modals respectively.

(4) Extracting Candidate Regions

After the above-mentioned feature extraction, in order to obtain a candidate region that basically covers two modals, the present invention first performs a 1×1 convolution operation on the feature map for point-to-point fusion, and uses a region proposal network (RPN) to extract the candidate region. Specifically, the obtained fusion feature map is subjected to one convolution, and the sliding window convolution is performed on the new feature map obtained by the convolution.

Each convolution position on the feature map represents a set of anchor points, each of which has 9 anchor points, including 3 different scales and aspect ratios. The convolution result of each anchor point is a set of 256-dimensional vector representations. Two fully connected layers are simultaneously used to predict whether the sum of the regression value of the bounding box is the target score value. In the step, except for the layers involved in a pre-training initialization, a Gaussian distribution with a mean value of 0 and a standard deviation of 0.01 is used for initialization in the other new layers. Through back-propagation training, the required RPN can be obtained.

(5) Predicting the Transformation Relationship Between the Reference Modal and the Sensing Modal In order to eliminate the displacement of the detected regions between different modals and gather features, the present invention provides a region feature alignment module to predict the offset transformation relationship between the reference modal and the sensing modal. The region alignment module first gives out several regions of interest, and then moderately expands the RoI so as to include enough contextual information of the region. For each modal, we use the RoIAlign layer to gather region features into a small feature map with a H×W fixed spatial range (for example, 7×7), where, H, W is a numerical parameter and has no practical meaning. Then the residual region features are calculated by subtraction and sent to the fully connected layer to predict the positional deviation of the region between the two modals. Since the color-thermal label pair is proposed, the color is the reference modal and the thermal is the sensing modal, we can access the calibration area of the two modals, so the offset target can be calculated according to formula (1) (2):

$$t_x = (x_s - x_r)/w_r \quad (1)$$

$$t_y = (y_s - y_r)/h_r \quad (2)$$

where, the offset target includes an offset target $t_x, t_y$ corresponding to a center coordinate x, y of the shared candidate region, $x_s, x_r$ respectively represent the calibrated X axis coordinate values of the sensing modal and the reference modal, $y_s, y_r$ respectively represent the calibrated y axis coordinate values of the sensing modal and the reference modal, $w_r$ represents the width of the bounding box of the reference modal, and $h_r$ represents the height of the bounding box of the reference modal.

We use the Smooth L1 loss as the regression loss to evaluate and predict the accuracy of the offset transformation, and the calculation is shown in formula (3):

$$L_{trans}(\{p_i^*\}, \{t_i\}, \{t_i^*\}) = \frac{1}{N_{trans}} \sum_{i=1}^{n} p_i^* smoothL_1(t_i - t_i^*) \quad (3)$$

where, i is the index of the RoI in the mini-batch training set, $t_i$ is the coordinate predicted after the offset transformation, $p_i^*$ is the classification label of the corresponding real bounding box (pedestrian is 1, the background is 0), and $t_i^*$ is the coordinate of the corresponding real bounding box, $N_{trans}$ is the total number of target bounding boxes waiting to be aligned, and the $L_{trans}$ function represents the loss value of the bounding box transformation target.

For each training sample, we minimize the objective function, and the calculation is shown in equation (4):

$$L(\{p_i\},\{t_i\},\{g_i\},\{p_i^*\},\{t_i^*\},\{g_i^*\})=L_{cls}(\{p_i\},\{p_i^*\})+\lambda L_{trans}(\{p_i^*\},\{t_i\},\{t_i^*\})+L_{reg}(\{p_i^*\},\{g_i\},\{g_i^*\}) \quad (4)$$

where, $p_i$ and $g_i$ are the prediction confidence and coordinate of a pedestrian, $g_i^*$ is the coordinate of the corresponding reference detection box, $L_{reg}$ represents regression loss, $L_{cls}$ represents classification loss, $L_{trans}$ and $L_{reg}$ are weighted by the balance parameter $\lambda$. In order to make these two items roughly equal, the present invention provides $\lambda=1$.

(6) RoI Jitter Strategy

In order to reduce the influence of training deviation and further enhance the stability of the region feature alignment (RFA) module, the present invention proposes a RoI jitter training strategy. By performing random jitter within a certain range of RoI, we can obtain a new offset transformation relationship between modals, as shown in equation (5):

$$t_x^j, t_y^j \sim N(0, \sigma_0^2; 0; \sigma_1^2; 0) \quad (5)$$

where, $t_x^j, t_y^j$ represents the coordinate of the offset target, the $N(.)$ function represents the two-dimensional normal distribution, $\sigma$ represents the standard deviation of the normal distribution, $\sigma_0^2$ represents the variance value on the x-axis, and $\sigma_1^2$ represents the variance value on the y-axis.

By using the inverse process of the bounding box offset transformation shown in formula (5), the RoI jitters to a new region $RoI_j$ of interest, and the corresponding offset target calculation and model prediction are performed on this new RoI. This step can enhance the diversity of training data and improve the generalization ability of the model to offset. The specific jittering method and range can be set as needed to adapt to different scenarios and tasks.

(7) Region Feature Pooling

After synthesizing the aligned region features of each modal, the feature representation of each region of interest is obtained. In addition, the output results of the RPN are fused and applied to the region fully connected convolutional neural network, and the feature representation of the region of interest is obtained by pooling through the RoIAlign method. This step does not require additional learning parameters. Among them, the RoIAlign method obtains the target value through interpolation, which can reduce the rough quantization of the feature map during pooling.

(8) Bounding Box Classification and Position Deviation Regression

For the feature representation obtained in the previous step, the two-layer fully connected classifier is used for classification processing. In the two-layer fully connected classifier, the first-layer fully connected layer is initialized by pre-training weights, and the second-layer fully connected layer is initialized with the normal distribution, and the deviation regression is predicted to refine the position of the bounding box.

(9) Sparse Processing

The neural network structure is constructed from the above steps, and then the back-propagation training is carried out on the neural network structure. After the training, the pruning method is used to perform the sparse processing on the network.

2. The Method for Difference Automatic Calibration in Cross Modal Target Detection Step S10, the plurality of modals of color-thermal images to be detected are obtained, and the input image set is constructed.

In the embodiment, the plurality of modals of color-thermal images are first obtained, that is, visible light and infrared image information. The visible light image has a high signal-to-noise ratio, and has richer detailed information such as color, edge, and texture, which can reflect more edge and texture information in the background. However, it is greatly affected by the lighting conditions, which can easily lead to unclear images. Infrared images are mainly formed by collecting the different thermal intensities of the target and the background using infrared cameras, and use the temperature difference between the pedestrian target and the background to highlight the target, and are not affected by shadows or light conditions. Therefore, visible light and infrared images have become an important means for full-time pedestrian detection based on vision. The pixel value is normalized based on the obtained visible light and infrared images, and the distribution of pixels is simplified and regularized.

Step S20, the feature map of each modal image in the input image set is acquired, and the shared candidate region is extracted based on the feature map of the each modal image.

In the embodiment, based on the plurality of modals of color-thermal images obtained by normalization, multiple regions are taken from the images, and the score of the category (pedestrian/background) of the target is calculated for each region, a 1×1 convolution operation is performed for point-to-point fusion, and a series of candidate regions are generated by using a multi-modal fusion RPN.

While deepening the number of network layers, VGG 16 uses a 3×3 small convolution kernel in all layers in order to avoid too many parameters, and the convolution layer step size is set to 1. Based on the input images, multiple regions are taken from the images, various scores for each region are calculated, and finally the average value is calculated so as to obtain the feature map.

The 1×1 convolution operation is performed on the feature map for point-to-point fusion, and the candidate regions are obtained by the convolution fusion of the feature map using the RPN.

Step S30, the each shared candidate region obtained is aligned, and the feature representation of the each shared candidate region is obtained through pooling.

In the embodiment, the RoIAlign method is used to gather a region feature of the shared candidate region, and the region feature residual is obtained by using subtraction. Based on the region feature residual, the offset target is calculated, and the offset target is transformed through the Smooth L1 loss. Based on the aligned shared candidate regions, the feature representation of the shared candidate regions is obtained by the pooling of the trained region features.

Step S40, the category of the feature representation of the shared candidate region is obtained based on the preset two-layer fully connected classifier, and the position of the shared candidate region is obtained through deviation regression.

In the embodiment, the feature representation of the shared candidate region is identified based on the two-layer fully connected classifier, and based on the region feature residual obtained in S30, the location of the shared region is obtained by regression analysis.

In the two-layer fully connected classifier, the first-layer fully connected layer is initialized by pre-training weights, and the second-layer fully connected layer is initialized with the normal distribution, and the deviation regression is predicted to refine the position of the bounding box.

Step S50, according to the category of the feature representation of the shared candidate region, the non-maximum value suppression is adopted to obtain the shared candidate region with the highest probability, and the marking is performed after returning to the image to be detected according to the position of the shared candidate region.

In the embodiment, according to the classified shared candidate region, through the traditional non-maximum algorithm, a threshold of the non-maximum value is set to 0.5. By arranging all output boxes in the category in descending order, redundant boxes that have a higher degree of overlapping with the highest-scoring box than the threshold are gradually deleted, and the shared candidate region with the highest probability is found, that is, the region where the pedestrian target is located.

Figure 2:
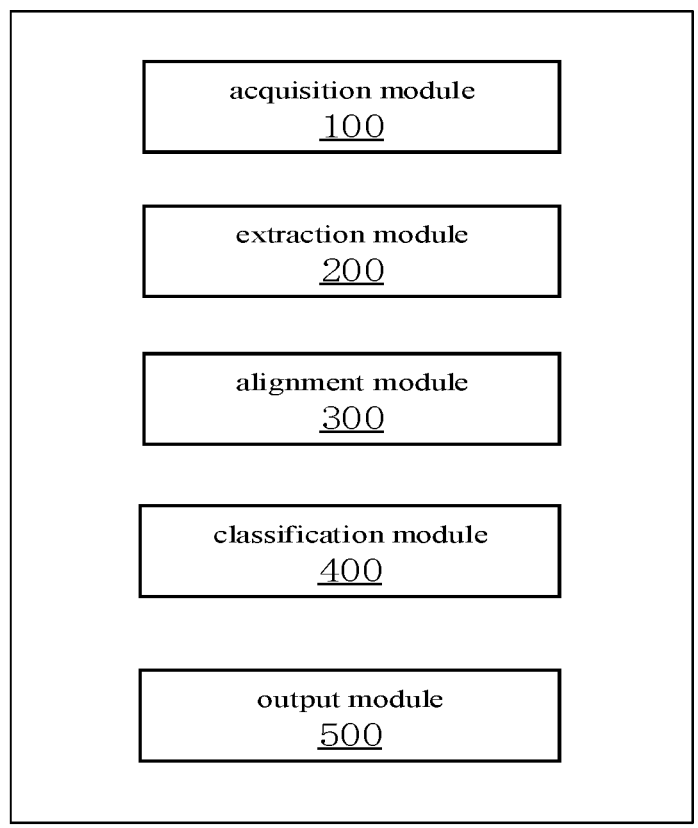
FIG. 2 is a block diagram of an embodiment of the system for difference automatic calibration in cross modal target detection of the present invention.

In the second embodiment, the invention provides a system for difference automatic calibration in cross modal target detection, as shown in FIG. 2. The system includes the acquisition module 100, the extraction module 200, the alignment module 300, the classification module 400, and the output module 500.

The acquisition module 100 is configured to obtain a plurality of modals of color-thermal images to be detected, and construct an input image set.

The extraction module 200 is configured to acquire a feature map of each modal image in the input image set, and extract a shared candidate region based on the feature map of the each modal image.

The alignment module 300 is configured to align the each shared candidate region obtained, and obtain a feature representation of the each shared candidate region through pooling.

The classification module 400 is configured to obtain a category of the feature representation of the shared candidate region based on a preset two-layer fully connected classifier, and obtain a position of the shared candidate region through deviation regression.

The output module 500 is configured to, according to the category of the feature representation of the shared candidate region, adopt non-maximum value suppression to obtain a shared candidate region with the highest probability, and return to the image to be detected for marking according to the position of the shared candidate region.

Those skilled in the technical field can clearly understand that for the convenience and conciseness of description, the specific working process and related illustration of the system described above can refer to the corresponding process in the method embodiment, which will not be repeated here.

It should be noted that the system for difference automatic calibration in cross modal target detection provided by the above-mentioned embodiment is only illustrated based on the division of the above-mentioned functional modules. In practical applications, the above-mentioned functions can be assigned to different functional modules as required. That is, the modules or steps in the embodiments of the present invention can be further decomposed or combined. For example, the modules of the above embodiments can be combined into one module, or further divided into multiple sub-modules to complete all or part of the functions described above. The names of the modules and steps involved in the embodiments of the present invention are only for distinguishing each module or step, and are not regarded as improper limitations on the present invention.

In the third embodiment, the present invention provides a storage device with a plurality of programs stored thereon, and the programs are loaded by a processor and implement the above-mentioned method for difference automatic calibration in cross modal target detection.

In the fourth embodiment, the present invention provides a processing device, including a processor and a storage device. The processor is suitable for executing each program; the storage device is suitable for storing a plurality of programs; the programs are suitable for being loaded by the processor and implement the above-mentioned method for difference automatic calibration in cross modal target detection.

Those skilled in the technical field can clearly understand that, to be convenient and concise, the specific working process and relevant illustration of the storage device and processing device described above can refer to the corresponding process in the method embodiment, which will not be repeated here.

Those skilled in the art should be able to realize that the modules and method steps described in the embodiments herein can be realized by electronic hardware, computer software or a combination of the two. The programs corresponding to the software modules and method steps can be placed in random access memory (RAM), memory, read only memory (ROM), electrically programmable ROM, and electrically erasable programmable ROM, register, hard disk, removable disk, CD-ROM, or any other form of storage medium known in the technical field. In order to clearly illustrate the interchangeability of electronic hardware and software, the modules and steps of each example have been described generally in terms of function in the above description. Whether these functions are executed by electronic hardware or software depends on the specific application and design constraint conditions of the technical solution. Those skilled in the art can use different methods for each specific application to implement the described functions, but such implementation should not be considered as going beyond the scope of the present invention.

The terms "first", "second", etc. are used to distinguish similar objects, rather than to describe or indicate a specific order or sequence.

The term "include/including" or any other similar term refers to a non-exclusive inclusion, so that a process, method, article or equipment/device including a series of elements includes not only those elements, but also other elements not explicitly listed, or also includes the inherent elements of the process, method, article or equipment/device.

So far, the technical solutions of the present invention have been described in conjunction with the preferred embodiments shown in the drawings. However, those skilled in the art will readily understand that the protection scope of the present invention is obviously not limited to these specific embodiments. Without departing from the principle of the present invention, those skilled in the art can make equivalent changes or substitutions to the relevant technical features, and the technical solutions obtained after these changes or substitutions will fall within the protection scope of the present invention.

What is claimed is:

1. A method for a difference automatic calibration in a cross modal target detection, comprising:
   step S10, obtaining a plurality of modals of color-thermal images to be detected, and constructing an input image set;
   step S20, acquiring a feature map of each modal image of the plurality of modals of color-thermal images in the input image set, and extracting a shared candidate region based on the feature map of the each modal image;
   step S30, aligning the shared candidate region, and obtaining a feature representation of the shared candidate region through a pooling;
   step S40, obtaining a category of the feature representation of the shared candidate region based on a preset two-layer fully connected classifier, and obtaining a position of the shared candidate region through a deviation regression;
   step S50, adopting a non-maximum value suppression to obtain a predetermined shared candidate region with a highest probability according to the category of the feature representation of the shared candidate region, and returning to the plurality of modals of color-thermal images to be detected for marking according to the position of the shared candidate region.

2. The method according to claim 1, wherein, a method of extracting the shared candidate region based on the feature map of the each modal image comprises: first performing a 1×1 convolution operation on the feature map of the each modal image for a point-to-point fusion, and using a region proposal network (RPN) to extract the shared candidate region.

3. The method according to claim 1, wherein, a method of aligning the shared candidate region comprises:
   using a RoIAlign method to gather a region feature of the shared candidate region, and using a subtraction to calculate a region feature residual;
   based on the region feature residual, obtaining an offset target, and transforming and aligning the offset target through a Smooth L1 loss.

4. The method according to claim 3, wherein the offset target comprises a first offset target $t_x$, $t_y$ corresponding to a center coordinate x, y of the shared candidate region, and an obtaining method is:

$$t_x = (x_s - x_r)/w_r$$

$$t_y = (y_s - y_r)/h_r$$

where, $x_s$, $x_r$ respectively represent calibrated X axis coordinate values of a sensing modal and a reference modal, $y_s$, $y_r$ respectively represent calibrated y axis coordinate values of the sensing modal and the reference modal, $w_r$ represents a width of a bounding box of the reference modal, and $h_r$ represents a height of the bounding box of the reference modal.

5. The method according to claim 4, wherein the first offset target randomly jitters during a training process to obtain a second offset target with an offset transformation relationship between the sensing modal and the reference modal, and a calculation formula is as follows:

$$t_x^j, t_y^j \sim N(0, \sigma_0^2; 0, \sigma_1^2; 0)$$

where, $t_x^j, t_y^j$ represents a coordinate of the second offset target, the N(.) function represents a two-dimensional normal distribution, $\sigma$ represents a standard deviation of the two-dimensional normal distribution, $\sigma_0^2$ represents a variance value on an X axis, $\sigma_1^2$ represents a variance value on a y axis.

6. The method according to claim 2, wherein, in a training process of the RPN, a Gaussian distribution with a mean value of 0 and a standard deviation of 0.01 is used for initialization in layers not involved in a pre-training initialization.

7. The method according to claim 1, wherein, in the non-maximum value suppression of step S50, a threshold is set to 0.5, output boxes in the category are arranged in a descending order, and redundant boxes are gradually deleted, wherein the redundant boxes have a higher degree of overlapping with a highest-scoring box than the threshold.

8. A system comprising a processor and a memory for a difference automatic calibration in a cross modal target detection, the memory comprising an acquisition module, an extraction module, an alignment module, a classification module, and an output module; wherein
   the acquisition module is configured to obtain a plurality of modals of color-thermal images to be detected, and construct an input image set;
   the extraction module is configured to acquire a feature map of each modal image of the plurality of modals of color-thermal images in the input image set, and extract a shared candidate region based on the feature map of the each modal image;
   the alignment module is configured to align the shared candidate region, and obtain a feature representation of the shared candidate region through a pooling;
   the classification module is configured to obtain a category of the feature representation of the shared candidate region based on a preset two-layer fully connected classifier, and obtain a position of the shared candidate region through a deviation regression; and
   the output module is configured to adopt a non-maximum value suppression to obtain a predetermined shared candidate region with a highest probability according to the category of the feature representation of the shared candidate region, and return to the plurality of modals of color-thermal images to be detected for marking according to the position of the shared candidate region.

9. A storage device, wherein, a plurality of programs are stored on the storage device, and the plurality of programs are loaded by a processor and execute the method according to claim 1.

10. A processing device, comprising a processor and a storage device; wherein the storage device is configured to store a plurality of programs, and the processor is configured to execute each program of the plurality of programs; wherein, the each program is configured to be loaded by the processor and implements the method according to claim 1.

11. The storage device according to claim 9, wherein, a method of extracting the shared candidate region based on the feature map of the each modal image comprises: first performing a 1×1 convolution operation on the feature map of the each modal image for a point-to-point fusion, and using a region proposal network (RPN) to extract the shared candidate region.

12. The storage device according to claim 9, wherein, a method of aligning the shared candidate region comprises:
   using a RoIAlign method to gather a region feature of the shared candidate region, and using a subtraction to calculate a region feature residual;

based on the region feature residual, obtaining an offset target, and transforming and aligning the offset target through a Smooth L1 loss.

13. The storage device according to claim 12, wherein the offset target comprises a first offset target $t_x, t_y$ corresponding to a center coordinate x, y of the shared candidate region, and an obtaining method is:

$$t_x=(x_s-x_r)/w_r$$

$$t_y=(y_s-y_r)/h_r$$

where, $x_s, x_r$ respectively represent calibrated X axis coordinate values of a sensing modal and a reference modal, $y_s, y_r$ respectively represent calibrated y axis coordinate values of the sensing modal and the reference modal, $w_r$ represents a width of a bounding box of the reference modal, and $h_r$ represents a height of the bounding box of the reference modal.

14. The storage device according to claim 13, wherein the first offset target randomly jitters during a training process to obtain a second offset target with an offset transformation relationship between the sensing modal and the reference modal, and a calculation formula is as follows:

$$t_x^j, t_y^j \sim N(0, \sigma_0^2; 0, \sigma_1^2; 0)$$

where, $t_x^j, t_y^j$ represents a coordinate of the second offset target, the N(.) function represents a two-dimensional normal distribution, σ represents a standard deviation of the two-dimensional normal distribution, $\sigma_0^2$ represents a variance value on an x axis, $\sigma_1^2$ represents a variance value on a y axis.

15. The storage device according to claim 11, wherein, in a training process of the RPN, a Gaussian distribution with a mean value of 0 and a standard deviation of 0.01 is used for initialization in layers not involved in a pre-training initialization.

16. The storage device according to claim 9, wherein, in the non-maximum value suppression of step S50, a threshold is set to 0.5, output boxes in the category are arranged in a descending order, and redundant boxes are gradually deleted, wherein the redundant boxes have a higher degree of overlapping with a highest-scoring box than the threshold.

17. The processing device according to claim 10, wherein, a method of extracting the shared candidate region based on the feature map of the each modal image comprises: first performing a 1×1 convolution operation on the feature map of the each modal image for a point-to-point fusion, and using a region proposal network (RPN) to extract the shared candidate region.

18. The processing device according to claim 10, wherein, a method of aligning the shared candidate region comprises:
using a RoIAlign method to gather a region feature of the shared candidate region, and using a subtraction to calculate a region feature residual;
based on the region feature residual, obtaining an offset target, and transforming and aligning the offset target through a Smooth L1 loss.

19. The processing device according to claim 18, wherein the offset target comprises a first offset target $t_x, t_y$ corresponding to a center coordinate x, y of the shared candidate region, and an obtaining method is:

$$t_x=(x_s-x_r)/w_r$$

$$t_y=(y_s-y_r)/h_r$$

where, $x_s, x_r$ respectively represent calibrated X axis coordinate values of a sensing modal and a reference modal, $y_s, y_r$ respectively represent calibrated y axis coordinate values of the sensing modal and the reference modal, $w_r$ represents a width of a bounding box of the reference modal, and $h_r$ represents a height of the bounding box of the reference modal.

20. The processing device according to claim 19, wherein the first offset target randomly jitters during a training process to obtain a second offset target with an offset transformation relationship between the sensing modal and the reference modal, and a calculation formula is as follows:

$$t_x^j, t_y^j \sim N(0, \sigma_0^2; 0, \sigma_1^2; 0)$$

where, $t_x^j, t_y^j$ represents a coordinate of the second offset target, the N(.) function represents a two-dimensional normal distribution, σ represents a standard deviation of the two-dimensional normal distribution, $\sigma_0^2$ represents a variance value on an x axis, $\sigma_1^2$ represents a variance value on a y axis.

* * * * *